Oct. 26, 1926.
V. A. FYNN
1,604,901
ASYNCHRONOUS INDUCTION MOTOR
Filed April 23, 1925
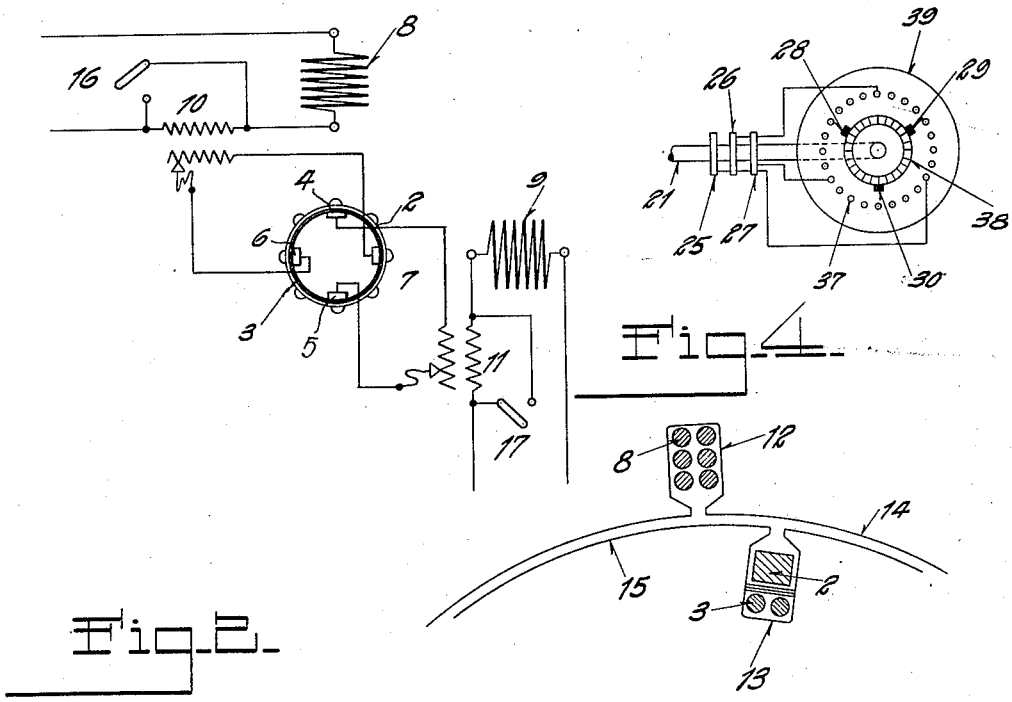
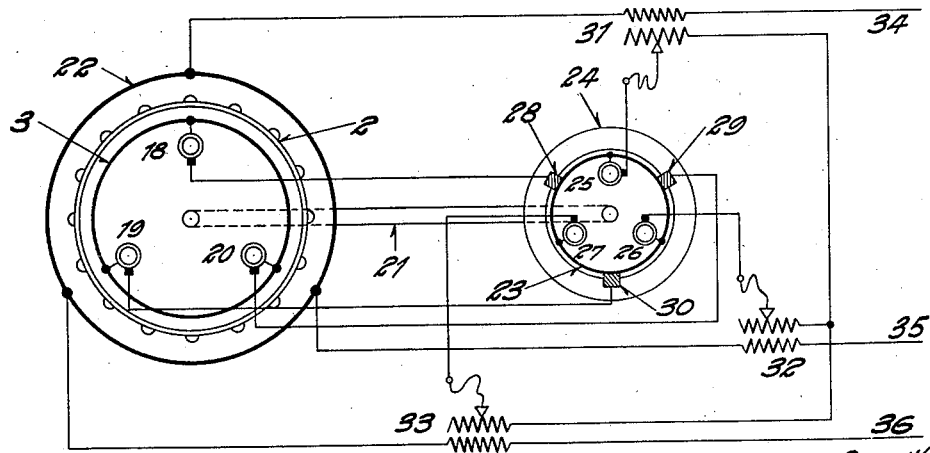
Inventor.
VALÈRE ALFRED FYNN.

Patented Oct. 26, 1926.

1,604,901

UNITED STATES PATENT OFFICE.

VALÈRE ALFRED FYNN, OF ST. LOUIS, MISSOURI.

ASYNCHRONOUS INDUCTION MOTOR.

Application filed April 23, 1925. Serial No. 25,223.

My invention relates to polyphase nonsynchronous induction motors and particularly to the control and improvement of the power factor of such machines.

The nature of the invention is fully set forth in the specification taken in conjunction with the accompanying drawings and particularly pointed out in the appended claims.

Fig. 1 is a diagrammatic representation of one embodiment of the invention as applied to a two-pole two-phase motor having a commutator, Fig. 2 is an embodiment as applied to a three-phase two-pole motor without commutator and operating in conjunction with an exciter, Fig. 3 is a modification of the exciter of Fig. 2 and Fig. 4 shows the preferred arrangement of the several windings on the primary and secondary members of such machines.

Referring to Fig. 1, the rotor or revolving member is provided with two windings, the winding 2 closed along a plurality of axes per pole pair and shown in the form of a squirrel cage and the commuted winding 3 of the ordinary direct current type. A polyphase, here two-phase, arrangement of brushes 4, 5 and 6, 7 co-operates with the commuted winding 3. In practice these brushes would be held in a brush rocker positioned on the stator and would co-operate with a commutator connected to the winding 3. In the figure the brush rocker is not shown and the brushes are supposed to be resting directly on the commuted winding 3 which is simply represented by a circle. The stationary member or stator carries the two-phase primary windings 8, 9 displaced by 90 electrical degrees as is usual in two phase windings. The primary of the series transformer 10 is included in circuit with the line and the primary 8, the primary of the series transformer 11 is included in circuit with the line and the primary 9. The secondary of the series transformer 10 is in circuit with the brushes 6, 7 and the secondary of the series transformer 11 is in circuit with the brushes 4, 5. Both transformers are of the adjustable ratio type. The axis of the brushes 6, 7 is displaced 90 electrical degrees from the axis of that primary winding 8 with which the brushes 6, 7 are connected in series relation. Similarly the axis of the brushes 4, 5 is displaced 90 electrical degrees from the axis of the primary winding 9 with which said brushes are connected in series relation.

This series relation is here brought about by the use of the aforesaid series transformers, it will be understood that this inductive connection can sometimes be replaced by a conductive one, the brushes being connected in series with the proper stator windings without the interposition of series transformers. The switches 16 and 17 make it possible to shortcircuit the primaries of the transformers 10, 11, thus rendering these transformers inoperative.

The commuted winding 3 can be located between the primary windings 8, 9 and the secondary winding 2 or the latter can be located between the primaries 8, 9 and the commuted winding 3. I prefer the latter arrangement and it is shown in greater detail in Fig. 4. In this figure the primary windings 8, 9 are located in the slots 12 of the stator 14 and preferably quite close to the air-gap, the commuted winding 3 is located in the bottom of the slots 13 of the rotor 15 and the secondary winding 2 is located above the winding 3, quite close to the air-gap between stator and rotor and between the primaries 8, 9 and the commuted winding 3. In view of the functions of the two secondary windings, I will refer to the shortcircuited winding 2 as the working and to the commuted as the exciting winding responsible for the phase compensation of the motor.

Referring to Fig. 2, the primary winding 22 of the motor is a delta connected three-phase winding represented by a circle, three equidistant points of which are connected to the three-phase supply 34, 35, 36 through the primaries of the adjustable ratio series transformers 31, 32, 33. The secondary carries a working winding 2 closed along a plurality of axes per pole pair and shown in the form of a squirrel cage, and an exciting or phase compensating winding 3. The latter is a three-phase winding connected to the sliprings 18, 19, 20; it is here connected in delta and represented by a circle. Mounted on the shaft 21 of the main motor is a two-pole exciter the rotor of which carries the commuted winding 23, this winding is connected in series relation with the primary winding 22 of the motor and with the supply by means of sliprings 25, 26, 27, brushes co-operating with same and the secondaries of the series transformers 31, 32, 33. A three-phase arrangement of brushes, corresponding to the three-phase exciting winding 3 and co-operating with the commuted winding of the exciter, is connected to the sliprings 18, 19, 20 of the exciting winding 3 of the motor. In practice the brushes 28, 29, 30 would rest on a commutator connected to 23 instead of on that winding itself. The rotor of the exciter is surrounded by a laminated stator or keeper 24 which need not carry any windings but which can support the brushes 28, 29, 30. This keeper can be omitted.

Fig. 3 shows a modification of the exciter used in Fig. 2, the rotor and stator laminations of that exciter are combined into a single element mounted on the shaft 21 and the winding 23 is located in holes 37 placed well within the outer periphery of the laminations 39, thus doing away with the air-gap between the rotor and the stator of the exciter of Fig. 2 without sacrificing the advantages connected with the use of a stator and while considerably simplifying the whole construction. The winding 23 is connected to a commutator such as 38 with which co-operate the brushes 28, 29, 30 and to the sliprings 25, 26, 27 connected to the secondaries of the series transformers 31, 32, 33, as in Fig. 2.

In all cases I prefer to arrange the windings on the motor as shown in Fig. 4. The primary windings in slots located close to the air-gap, as 8 of Fig. 4, regardless of the number of phases for which such winding is wound; the secondary working winding also in slots located close to the air-gap as 2 in Fig. 4; and the secondary exciting winding, whether of the commuted type or not, preferably so as to interpose the secondary working winding between it and the primary winding, as 3 in Fig. 4.

It will be understood that the number of phases of the secondary exciting winding can be chosen quite independently of the number of phases of the primary winding.

The idea underlying this invention is to produce the resultant revolving flux necessary for the operation of polyphase non-synchronous induction motors from the secondary instead of the primary and preferably by means of a winding which carries nothing but exciting currents or a winding which carries but a fraction of the load currents which must be carried by the secondary of such machines. To carry this idea into practice I provide the secondary with two windings, close one of them, the first preferably along a plurality of axes per pole pair, connect the other one, the second, in series relation with the primary windings and make such provisions as are necessary to the end that the currents thus conductively introduced into the second winding on the secondary are of the proper phase to produce the desired magnetization and of the same periodicity as the voltages generated in said winding by the relative motion between it and the resultant revolving flux of the motor.

Ordinarily a series connection such as just described would result in the current conduced into the second secondary winding increasing with increasing load. But the exciting currents of a polyphase induction motor should remain approximately constant and if the secondary excitation is allowed to increase with increasing load the result will be a power factor which will vary with varying load. This may be desirable in some cases and not desirable in others. To render the power factor more constant, for instance when using an inductive series connection between primary and secondary such as series transformers, I so select the ratio of these transformers of the number of turns of such a device that the desired power factor value, say unitary or thereabouts, is reached already at light loads and operate the iron of any such translating devices at high magnetic densities to the end that at higher loads the current conduced into the secondary exciting winding shall increase considerably slower than the primary current of the motor. While such an arrangement does not greatly improve the power factor at no-load and at very light loads, yet it allows of such motors being operated at higher efficiencies at such very light loads. At the higher loads phase compensation can be pushed to any reasonable degree without the slightest difficulty and without materially affecting the efficiency of such machines.

Reverting to the mode of operation of Fig. 1 and assuming that the windings 2, 3, 8 and 9 are located as more clearly shown in Fig. 4, let it be supposed that approximately unity power factor is desired over as wide a range of loads as possible and that the transformation ratio between the primary and the commuted winding is 3 to 1, three amperes in each commuted circuit being equivalent to one ampere in each primary circuit. Further assume that the magnetizing current in each primary circuit is one third of the primary full load current. The machine may be started like an ordinary squirrel cage motor and without changing the brush circuits, or the brush circuits may be opened at starting or the primaries of the series transformers 10, 11 shortcircuited by means of the switches 16, 17. When up to speed the brush circuits must be as shown in the figure.

When the machine is up to speed, i. e. running at a nearly synchronous speed, its mode of operation, particularly its power factor curve, will depend on the ratio of transformation of the series transformers 10, 11 and on the magnetic densities at which the iron in these transformers is worked. Assuming a 1:1 transformation ratio and low iron densities, there will be little difference between the primary and secondary ampereturns of the transformers and at full load the power factor of the motor will be about unity because the primary full load current is just about equal to the secondary magnetizing current. At less than full load the power factor will be below unity; at more than full load the power factor will tend to rise above unity, the primary current finally leading the primary terminal voltage. If under these same conditions the transformation ratio of the series transformers is changed to say 1:2, the secondary current being always about double the primary, unity power factor will be reached at a load which is considerably less than the full load and so on.

The difference between the primary and secondary ampereturns of the transformers depends on the impedance of the commuted winding 3 and on the constants of the transformers. If I so select the transformation ratio of said transformers that unity power factor is reached at a fractional load and so proportion their iron circuit that the densities in the transformer iron are already high at said fractional load, then a considerable increase in primary current beyond that point, and therefore a considerable increase in primary transformer ampereturns, will not be followed by a corresponding or even a marked increase in transformer flux and therefore not by a marked increase of secondary transformer current with the result that beyond a certain load the exciting or compensating current will increase but little and the power factor of the motor will change but little.

By placing the exciting winding 3 below the squirrel cage winding 2 or its equivalent, I make the mutual induction between 2 and the primary much better than the mutual induction between 3 and the primary and I facilitate the formation and flow of load currents in 2 and the primary and hinder it in the commuted winding with the result that in practice practically all the load currents will flow in the squirrel cage and in the primary and the commuted winding will carry practically nothing but exciting currents.

In the ordinary non-synchronous induction motor the primary carries all the magnetizing ampereturns and they lag by practically 90 degrees behind the load ampereturns. As the conduced exciting ampereturns in the winding 3 increase the lagging primary ampereturns diminish and can be made to reverse when the primary will take leading currents and the overall power factor may thus be made to rise to or above unity and thus become leading.

Because the periodicity of the secondary currents, including those circulating in the winding 3, is low, only equal to the slip frequency, there is, near synchronism, no appreciable phase difference between the voltage impressed on a secondary winding and the resultant current, for this reason it is more advantageous to excite such motors from the secondary.

In Fig. 1, line frequency currents are impressed on the polyphase arrangement of brushes co-operating with the commuted winding and they are transformed to slip frequency currents by means of the commutator attached to and co-operating with the commuted winding 3.

By excluding the load currents from the secondary exciting winding 3, it is possible to reduce it together with its commutator, its brushes and the series transformers to the smallest possible dimensions, thus increasing the efficiency of the machine, reducing the danger of commutation troubles and reducing the first cost and the cost of upkeep of the motor. The less complete the elimination of the working currents from the winding 3 the costlier the outfit, but the presence of such currents does not entirely destroy the utility of the invention. By making use of two secondary windings I force a distribution of the load ampereturns between the two and by making the impedance per volt of one of them higher than the impedance per volt of the other I force more of the load ampereturns to close through that which has the lower impedance per volt. One way of increasing this impedance per volt of the circuit of one of the secondary windings is to include in its circuit a source of exciting current, another and far more effective one is to make the inductive relation between the winding 3 carrying the exciting currents and the primary less good than the inductive relation between the secondary working winding 2 and the primary 8, 9.

In Fig. 2 the secondary exciting winding 3 is an ordinary polyphase winding, it is not a commuted winding as in Fig. 1 and I have therefore provided an external exciter excited by means of the primary motor currents and capable of delivering slip frequency currents to the motor exciting winding 3. To this end the secondaries of the series transformers 31, 32, 33 are connected to the sliprings 25, 26, 27 of the commuted winding 23 on the rotor of the exciter to produce a revolving flux rotating oppositely to the mechanical rotation of 23 and, in this case, also oppositely to the mechanical rotation of the secondary of the motor. Under these conditions the voltages appearing at the brushes 28, 29, 30 of the exciter will always be of slip frequency or of the same frequency as the voltages induced or generated in the motor exciting winding 3 by the revolving flux of that motor. The brushes 28, 29, 30 are set so that the currents they conduce into the exciting winding 3 may produce a revolving flux of same phase and direction as that which would be produced by the primary 22 of the motor. If a nearly constant power factor curve is desired regardless of changing motor load, this can be achieved by so selecting the transformation ratio of the series transformers or the electromagnetic constants of the exciter that the desired value of the power factor, say unity, is reached at as light a load as desired and by so dimensioning the iron circuit of said transformers or of the exciter that any increase in primary motor current beyond a predetermined value corresponding to some chosen motor load does not increase the exciting current conduced into 3 in the same ratio or even very materially. To secure approximate constancy of the current conduced into the winding 3 it is sufficient to work only a part of the magnetic circuit of the transformers or of the exciter at high densities.

When using the modified exciter construction shown in Fig. 3 the exciting current of the exciter is considerably reduced, at least at some loads, by the elimination of the air-gap between the winding 23 in the slots 37 and the surrounding iron, but the operation remains the same in principle.

In any case the amplitude of the exciter brush voltage remains constant regardless of the mechanical speed of the exciter rotor and provided the exciting flux of the exciter remains constant, but the mechanical speed of the exciter affects the periodicity of the brush voltage. When the exciter speed is synchronous its brush voltage is unidirectional and when said speed is zero the frequency of its brush voltage is equal to the line frequency.

It is not necessary that the exciter be driven at the same speed as the motor with which it co-operates, just so it runs synchronously when the motor speed is synchronous and is at a standstill when the motor is at rest. If the motor has ten poles and the exciter but two, the latter must be geared to the motor shaft so as to run five times as fast as the latter and can be of correspondingly smaller dimensions.

The functions of rotor and stator of the motor can be interchanged without in any way changing the operation of the machine.

A slipring phase winding can be used instead of the squirrel cage 2 with all the attending advantages and disadvantages of a slipring induction motor.

The arrangement is clearly not limited to any particular number of phases greater than one. In the case of a three phase motor, either three or six brushes may be used on the secondary as is well understood. While it is mostly perferable to use the same number of phases on the primary and on the secondary when the latter is a commuted winding, yet a three-phase stator can, for instance, be used with a two-phase arrangement of brushes on the rotor provided the number of primary phases are transformed to suit the number of secondary phases in some well understood manner. In the case of separately excited motors it is preferable to provide the exciter with an arrangement of brushes which corresponds with the number of phases for which the motor exciting winding is wound but the number of phases of the latter can be chosen quite independently of the number of phases of the primary of the motor or of that of the secondary working winding. Furthermore, the number of the commutator phases of the exciter can be chosen quite independently of the number of its slipring phases.

Throughout this specification the term primary member is applied to that member which carries the windings connected to the supply, which windings carry the line working currents, and whether or not these primary windings produce the revolving flux of the motor which flux always revolves synchronously with respect to the primary member. The other member is referred to as secondary whether or not it carries a winding or windings which produce all or a part of the revolving flux.

It is well known that any motor can be operated as a generator provided it be driven by a prime mover at a suitable speed, and it is also generally recognized that non-synchronous polyphase motors are no exception to this rule. It is further known that in the case of an asynchronous motor the voltages generated by the primary flux in any winding on the secondary change their direction when the machine passes from sub to supersynchronous speeds, thereby causing the machine to send working currents back to the line instead of drawing such currents from the supply. To keep the exciting circuits free from other than exciting currents is, of course, desirable whether the machine operates as a motor or as a generator. It is, therefore, to be understood that the terms used with reference to motor strucures and operation are employed descriptively rather than limitatively.

While theories have been advanced in connection with the machines referred to herein, this has been done with a view to facilitating their description and understanding, but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

Such subject matter as is disclosed in connection with Fig. 2 and not specifically claimed in this application is specifically claimed in application Serial Number 126,688 filed by me August 2, 1926.

Having thus described the invention, what is claimed is:

1. In a non-synchronous motor, a primary and a secondary, a polyphase winding on the primary, a winding on the secondary closed along a plurality of axes per pole pair, a second winding on the secondary said second winding being connected in series relation with the polyphase primary, means included in the circuit of said second winding for transforming the frequency of the current derived from the primary and impressed on the secondary, and means for destroying the proportionality between the currents in said second winding and the currents in the primary.

2. In a non-synchronous motor, a primary and a secondary, a polyphase winding on the primary, a winding on the secondary closed along a plurality of axes per pole pair, a second winding on the secondary said second winding being connected in inductive series relation with the polyphase primary, and means included in the circuit of said second winding for transforming the frequency of the currents derived from the primary and impressed on the secondary.

3. In a non-synchronous motor, a primary and a secondary, a polyphase winding on the primary, a winding on the secondary closed along a plurality of axes per pole pair, a second winding on the secondary, series transformers linking said second winding and the polyphase winding and means included in the circuit of said series transformers for causing the frequency of the currents conduced into the second winding to differ from the frequency of the currents in the primary.

4. In a non-synchronous motor, a primary and a secondary, a polyphase winding on the primary, a winding on the secondary closed along a plurality of axes per pole pair, a second winding on the secondary, series transformers linking said second winding and the polyphase winding, and means included in the circuit of said series transformers for causing the frequency of the currents conduced into the second winding to differ from the frequency of the currents in the primary, the iron in the series transformers being worked at such high densities that over part of the motor load range the ratio of primary to secondary transformer ampereturns increases materially with increasing load.

5. In a non-synchronous motor, a primary and a secondary, a polyphase winding on the primary, a winding on the secondary closed along a plurality of axes per pole pair, a second winding on the secondary said second winding being connected in series relation with the polyphase primary, means included in the circuit of said second winding for transforming the frequency of the current derived from the primary and conduced into the secondary, and means for keeping the current in the second winding on the secondary approximately constant over at least part of the load range of the motor.

6. In a non-synchronous motor, a primary and a secondary, a polyphase winding on the primary, a winding on the secondary closed along a plurality of axes per pole pair, a second winding on the secondary said second winding being connected in series relation with the polyphase primary, means included in the circuit of said second winding for transforming the frequency of the current derived from the primary and conduced into the secondary, and means for causing the current conduced into the second winding on the secondary to at first rise rapidly with increasing load and thereafter change but little as the load increases.

7. In a non-synchronous motor, a primary and a secondary, a polyphase winding on the primary, a winding on the secondary closed along a plurality of axes per pole pair, a second winding on the secondary in series relation with the polyphase primary, the first winding on the secondary being located between the polyphase primary and the second winding on the secondary.

8. In a non-synchronous motor, a primary and a secondary, a polyphase winding on the primary, a winding on the secondary closed along a plurality of axes per pole pair, a second winding on the secondary in series relation with the polyphase primary, the axis along which said second winding is connected to any one phase of the polyphase winding being displaced from the axis of said phase, and means for destroying the proportionality between the currents in said second winding and the currents in the primary.

9. In a non-synchronous motor, a primary and a secondary, a polyphase winding on the primary, a winding on the secondary closed along a plurality of axes per pole pair, a second winding on the secondary in series relation with the polyphase primary, the axis along which said second winding is connected to any one phase of the polyphase winding being displaced by about 90 electrical degrees from the axis of said phase, and means for destroying the proportionality between the currents in said second winding and the currents in the primary.

10. In a non-synchronous motor, a primary and a secondary, a polyphase winding on the primary, a winding on the secondary closed along a plurality of axes per pole pair, a second winding on the secondary in series relation with the polyphase primary, and means included in the circuits of the second secondary winding for changing the frequency of the currents conduced into it to that of the currents generated in the first secondary, the connections being so made as to cause the polyphase currents conduced into said second winding to produce a revolving flux the axis of which substantially coincides with that of the revolving flux produced by the primary when the power factor of the motor is well below unity.

11. In a non-synchronous motor, a primary and a secondary, a polyphase winding on the primary, a winding on the secondary closed along a plurality of axes per pole pair, a commuted winding on the secondary, a polyphase arrangement of brushes co-operating with the commuted winding and connected in series relation with the polyphase winding, and means for destroying the proportionality between the currents in said second winding and the currents in the primary.

12. In a non-synchronous motor, a primary and a secondary, a polyphase winding on the primary, a winding on the secondary closed along a plurality of axes per pole pair, a commuted winding on the secondary, a polyphase arrangement of brushes co-operating with the commuted and connected in series relation with the polyphase winding, the axis of each set of brushes being displaced from the axis of that phase of the polyphase winding to which it is connected, and means for destroying the proportionality between the currents in said second winding and the currents in the primary.

13. In a non-synchronous motor, a primary and a secondary, a polyphase winding on the primary, a winding on the secondary closed along a plurality of axes per pole pair and located close to the primary and in good inductive relation thereto, a commuted winding on the secondary, a polyphase arrangement of brushes co-operating with the commuted winding and connected in series relation with the polyphase winding, the axis of each set of brushes being displaced by 90 electrical degrees from the axis of that phase of the polyphase winding to which it is connected.

14. In a non-synchronous motor, a primary and a secondary, a polyphase winding on the primary, a winding on the secondary closed along a plurality of axes per pole pair, a commuted winding on the secondary, a polyphase arrangement of brushes co-operating with the commuted winding and connected in series relation with the polyphase winding, the first winding on the secondary being located between the polyphase primary and the second winding on the secondary.

15. In a non-synchronous motor, a primary and a secondary, a polyphase winding on the primary, a winding on the secondary closed along a plurality of axes per pole pair, a commuted winding on the secondary, a polyphase arrangement of brushes co-operating with the commuted winding, series transformers connecting the polyphase winding and the commuted winding through the brushes co-operating with same, the first winding on the secondary being located between the polyphase primary and the second winding on the secondary.

16. In a non-synchronous motor, a primary and a secondary, a polyphase winding on the primary, a winding on the secondary closed along a plurality of axes per pole pair, a commuted winding on the secondary, a polyphase arrangement of brushes co-operating with the commuted winding, series transformers connecting the polyphase winding and the commuted winding through the brushes co-operating with same, the first winding on the secondary being located between the polyphase primary and the second winding on the secondary, and the iron in the series transformers being worked at such high densities that over part of the operating range of the motor the ratio of primary to secondary transformer ampereturns increases materially with the increasing load.

17. In a non-synchronous motor, a primary and a secondary, a polyphase winding on the primary, a winding on the secondary closed along a plurality of axes per pole pair, a commuted winding on the secondary, a polyphase arrangement of brushes co-operating with the commuted winding, series transformers connecting the primary polyphase winding and the commuted winding through the brushes co-operating with same, the first winding on the secondary being located between the polyphase primary and the second winding on the secondary, and the series transformers being so dimensioned that over part of the operating range of the motor the secondary transformer ampereturns increase very little while the primary transformer apereturns increase materially.

18. The method of operating an asynchronous polyphase motor which consists in permitting the free formation of torque producing currents in one part of the secondary, injecting exciting currents into another part of the secondary for the purpose of compensating the motor and varying said injected currents with varying motor load.

19. The method of operating an asynchronous polyphase motor which consists in permitting the free formation of torque producing currents in one part of the secondary, restricting the formation of torque producing currents in another part of the secondary, injecting exciting currents in said other part in order to compensate the motor and varying said currents with varying motor load.

20. The method of operating an asynchronous polyphase motor which consists in permitting the free formation of torque producing currents in one part of the secondary, restricting the formation of torque producing currents in another part of the secondary, injecting exciting currents in said other part in order to compensate the motor, varying said injected currents almost proportionately with the load current at light loads and at the heavier loads varying said currents at a much slower rate relative to the variations of the load current.

21. In a non-synchronous polyphase motor, a primary and a secondary, two polyphase windings on the secondary, one of said windings being closed along a plurality of axes per pole pair, frequency changing means, means including said frequency changing means for connecting the other secondary winding in series relation with the primary, and means for excluding working currents from said other secondary winding over at least part of the load range.

22. In a non-synchronous polyphase motor, a primary and a secondary, two polyphase windings on the secondary, one of said windings being closed along a plurality of axes per pole pair, frequency changing means, means including said frequency changing means for connecting the other secondary winding in series relation with the primary, and means for opposing the formation of working currents in said second secondary winding.

23. In a non-synchronous polyphase motor, a primary and a secondary, two polyphase windings on the secondary one of said windings being closed along a plurality of axes per pole pair, frequency changing means, means including said frequency changing means for connecting the other secondary winding in series relation with the primary, means for maintaining the currents so conduced into the second winding approximately constant over at least part of the load range of the motor, and means for opposing the formation of working currents in said second secondary winding.

24. In a non-synchronous polyphase motor, a primary and a secondary, frequency converting means, means including said frequency converting means for connecting the secondary in series relation with the primary adapted to conductively introduce exciting current of secondary frequency into the secondary, and means for maintaining the conductively introduced current approximately constant over at least part of the load range.

25. In a non-synchronous polyphase motor, a primary, a secondary, polyphase working and exciting circuits on the secondary in inductive relation to the primary, means in series relation with the primary and including the polyphase exciting circuits on the secondary for producing at least part of the revolving field of the motor, and means for destroying the proportionality between the currents in the primary and the currents in the secondary exciting circuits.

26. In a non-synchronous polyphase motor, a primary, a secondary, polyphase working and exciting circuits on the secondary in inductive relation to the primary, means in series relation with the primary and including the polyphase exciting circuits on the secondary for producing at least part of the revolving field of the motor, and means for keeping the currents in the polyphase secondary exciting circuits approximately constant over at least part of the load range of the motor.

27. In a non-synchronous polyphase motor, a primary, a secondary, polyphase working and exciting circuits on the secondary in inductive relation to the primary, the working circuits being dimensioned to facilitate the formation of working currents therein, means connected in series relation with the primary and including the polyphase exciting circuits on the secondary to produce at least part of the revolving field of the motor, and means for opposing the formation of working currents in the revolving field producing secondary circuits.

28. In a non-synchronous motor a primary, a secondary, polyphase working and exciting windings on the secondary in inductive relation to the primary, means in series relation with the primary and including the polyphase exciting winding on the secondary for producing at least part of the revolving field of the motor, the impedance of the exciting circuit per volt generated in the exciting winding on the secondary exceeding the impedance of the working circuit per volt generated in the working winding on the secondary.

In testimony whereof I affix my signature this 15th day of April, 1925.

VALÈRE ALFRED FYNN.